Sept. 15, 1931.  A. L. JOHNSON  1,822,969
FLEXIBLE RACK JACK FOR BALLOON TIRES
Filed Oct. 12, 1925    2 Sheets-Sheet 1
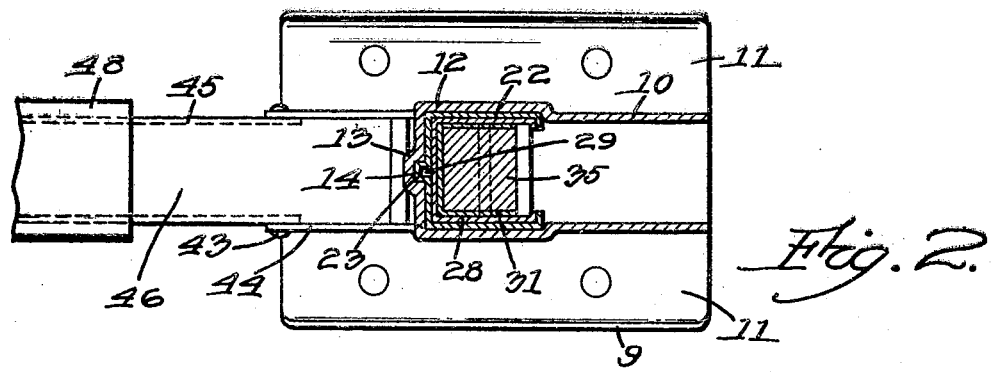
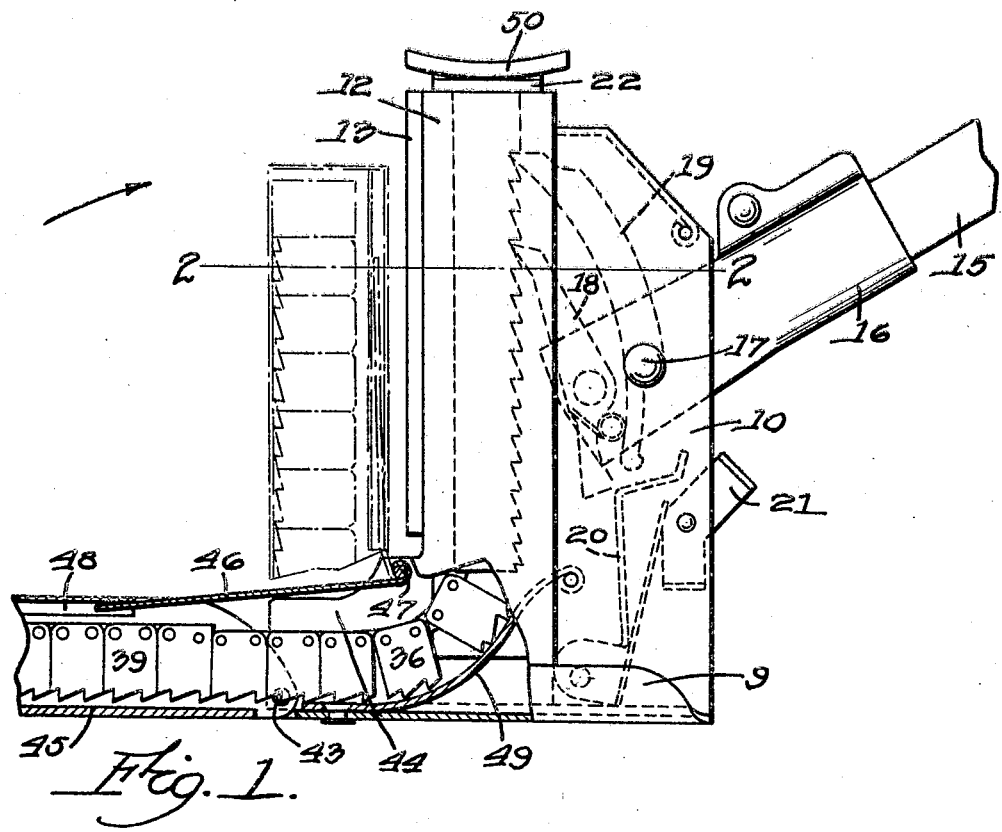
Inventor
Alvin L. Johnson
By Attorneys
Southgate Fay & Hanley

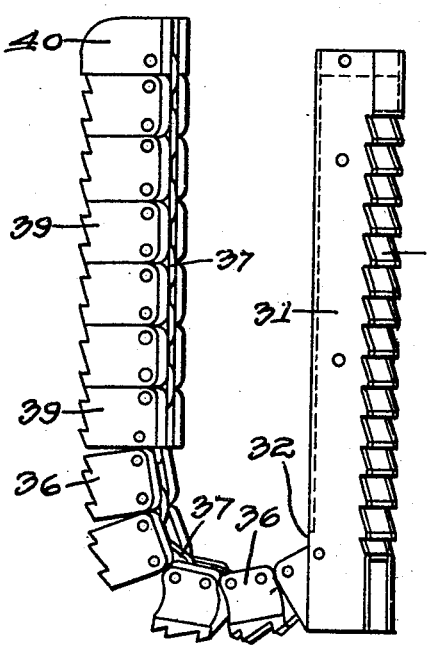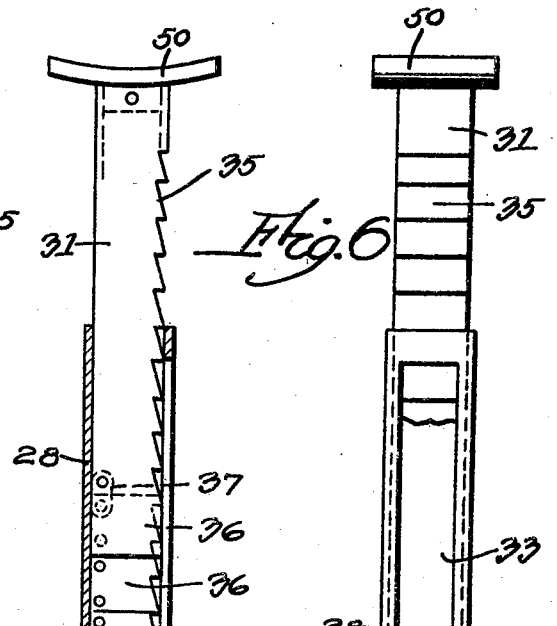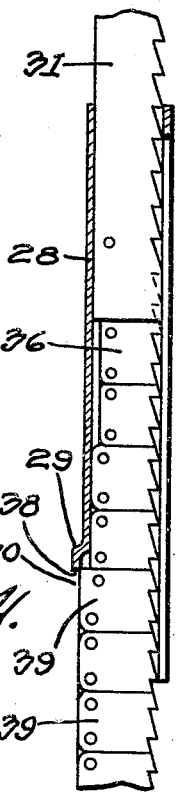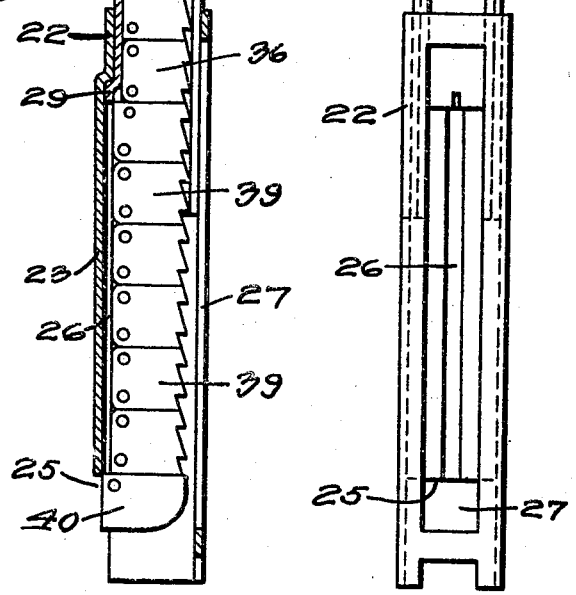

Patented Sept. 15, 1931

1,822,969

UNITED STATES PATENT OFFICE

ALVIN L. JOHNSON, OF WORCESTER, MASSACHUSETTS, ASSIGNOR TO W. GOULDING WARREN, OF HOLDEN, MASSACHUSETTS

FLEXIBLE RACK JACK FOR BALLOON TIRES

Application filed October 12, 1925. Serial No. 61,914.

This invention relates to a lifting jack capable of general use, but especially adapted for use in lifting an automobile high enough to allow balloon tires or other over-size tires to be changed. It is well known that the introduction of balloon tires has rendered most of the automobile jacks previously on the market useless because they were designed to lift a car only the distance required to change an ordinary tire. Now without altering the construction of the body of the car the balloon or other over-size tires with which it is equipped necessitate its being lifted a greater distance than before and still the minimum height of the jack cannot be increased because it must be low enough so that it can be put under the car when the tire is flat. Usually the course of design for overcoming these difficulties has been the use of the double screw principle which permits of the raising of the load carrying support to a position nearly three times the height of the jack when in its lowest position. This invention is designed for the purpose of avoiding the expense of manufacture of that type of jack by producing a jack which can be manufactured in quantities at very low prices and yet will accomplish the same purpose as the double screw jack. It will be understood of course that while this is designed especially as an automobile jack, it is capable of use for all purposes to which jacks are adapted and has nothing about it which unfits it for any such use. The invention involves the retention of the rack principle which the public had supposed practically had to be abandoned because any such rack heretofore known could rise only to an elevation twice the minimum height of the jack as its limit. I have discovered that this rack may be made in flexible form so as to be capable of raising the load to three times the normal height of the jack, or to any desired number of times within reasonable limits, and without necessitating the provision of any very heavy or complicated mechanism.

Other objects and advantages of the invention will appear hereinafter.

Reference is to be had to the accompanying drawings in which

Fig. 1 is a side view of a jack constructed in accordance with my invention with the lower part in section;

Fig. 2 is a horizontal sectional view on the line 2—2 in Fig. 1;

Fig. 3 is a perspective view of the rack taken out of the jack and shown in its position when lowered;

Fig. 4 is a side view of the rack with the upper hollow housing member thereon in section;

Fig. 5 is a similar view of the rack and hollow housing members, raised to its limiting position with respect to the lower one, and Fig. 6 is an edge view of the same with the parts in the same position.

I have shown the jack as formed with a pressed metal casing 10 having a base 11 with upturned sides 9 on which this casing is fixed or forming a part of the same. The casing is provided with a hollow upright part 12 which constitutes a guide open at the top. This guide may be of any desired shape but I have shown it square in cross section with a guide 13 extending vertically from the top to the bottom along one side. It is provided with a groove 14 extending along inside it from the bottom to a position near the top inside the guide.

The other part of the casing 10 constitutes a housing for any desired form of gear and worm or ratchet mechanism, the latter being indicated in dotted lines in Fig. 1. I have shown a well known type or ratchet mechanism operated by handle 15 which fits in a socket 16 pivoted on a stud 17. The ratchet mechanism shown includes two pawls 18 and 19 with a trip 20 for shifting them as the handle goes up and down and a lever 21 for changing the position of the spring 20 so as to cause the rack to be raised or lowered in accordance with the position of this detent. This ratchet mechanism is old and well known in this art, therefore the operation and construction will not be described in full. It can be replaced by a worm or other mechanism for operating a rack.

Slidably mounted in the upright 12 is a hollow upright member or housing 22 of square form fitting in the guide 12. This member 22 has a projecting spline 23 fitting in the groove 14 as a guide. This member 22 is provided with an opening 25 at its rear side, that is the side on which the guide 23 is located, and at the bottom of that guide for a purpose to be described. On the other side this sliding section 22 has an opening 27 from bottom to top practically for permitting the pawls 18 and 19 to enter it and perform their functions. Also located along the rear side of this hollow square section 22 on the interior is a vertical guide slot 26. This extends from the bottom where it is open to a point near the top which constitutes a stop.

Inside this square housing member 22 is a similar housing member 28, the four sides of which are flat and which is square in cross section. On the rear side there is a stop guide 29 near the bottom movable in the slot 26 and constituting a stop to prevent this member from rising out of the member 22 in which it is contained. This member also has an opening 30 at the bottom of the rear to register with the opening 25 when the parts are collapsed. Its front side has an opening 33 from a point near the top clear through to the bottom for admitting the pawls.

Inside this member 28 slides the top housing member 31 of the rack if there are to be only three sections. I have shown this top member as formed like the others of pressed metal, square and U-shaped in cross section, and having an opening 32 in the back registering with the openings 25 and 30 but it can be made in other ways as will be described. The three housing members 22, 28 and 31 constitute a telescoping housing for the flexible rack to hold it rigidly.

This top member is provided with a rack section 35. This rack can be in a single rigid piece of metal from the top of the member 31 but at a point near the bottom the lower part of the rack which is located in this member consists of a separate hinged link 36 in the present form having two rack teeth on it. This is hinged to the bottom of the rigid rack section 35 by a central link 37 pivoted in two places and permits of this link swinging out backwardly through the opening 32. It will be seen that the several openings 25, 30 and 32, when the three members of the device are telescoped into the lowest position of the jack as indicated in Fig. 1, provide a space through which the link can swing out backwardly. It will be understood, of course, that this top section can be made without any external casing by using the rack 35 itself as the entire section but in the form shown this rack is riveted to the section or casing 31 and anyway it forms a unitary piece which supports the work rest 50.

The rest of the rack below the rigid top section 31 is made up of a number of other pivoted links 36 just like the one described to form a flexible central section and a second series of links 39 to form a lower flexible section. The links of this rack are pivotally connected together by links 37 so as to be freely flexed backwardly. The rack links 36 and 39 have horizontal top and bottom surfaces having such relation to the adjacent links that the rack cannot be flexed in the slightest degree forwardly. Each link contains two rack teeth although they are divided at points between the teeth, as shown in the accompanying drawings.

The links 36 are all of the same width as the rigid section 35 and are capable of passing freely through the member 28. The links 39 are wider than the links 36 so that they fit within the interior of the member 22. Furthermore, they project back of the sections 36 at 38 so that when raised far enough the top link 39 will engage under the bottom edge of the member 28 which is cut out at 30 to form an opening. These links will pass up into the opening and to the top thereof. This constitutes a stop to limit the descent of this member 28 and provides for lifting this member by the flexible rack. The links 39 terminate in a bottom link 40 which can be forced up into the outside housing member 22, and projects to lift the member 22.

On the back side of the jack there is pivoted about a pivot 43 on an extension 44 of the casing a square receiver 45 for the flexible rack. This is capable of being swung through an angle of 90° as indicated in Fig. 1 and is provided with an opening at the joint to permit of this motion and with a plate 46 pivoted at 47 to move with the receiver and guided in a chamber 48 on the top wall thereof. At the bottom of the casing is a deflector 49 in fixed position for deflecting the pivoted links of the rack backwardly into the receiver 45 when it lies in horizontal position as shown in Fig. 1.

In operation it will be seen that the top of the rack is rigid by construction while the flexible part of it that is adjacent to the pawls is always held rigidly in the telescoping housing which has been described and which expands and contacts with the rack. The lower part of the rack may be loose and flexible and located in the receiver 45 but any part of it that is in vertical position where it can be engaged by the pawls is just as rigid as if the parts were in one piece. The sections are held so by the housing in which they are located and by the fact that as constructed, the rack can be bent in one direction only. It is rigid in three directions and can swing in no direction except backwardly. These housings are all solid on the back except for the three openings through which the links of the racks can swing backwardly at the bottom. Assuming the rack to be raised as shown in Figs. 5 and 6, the detent 21 is turned to permit the pawls to lower the rack as the handle is vibrated. When the rack comes to a low enough position the bottom link 40 engages the deflector 49 and swings backwardly through the opening 25. It cannot move in any other direction because the rack is being lowered by the weight applied to the work rest 50 and there is no other direction in which this bottom link can move. Its front lower edge is rounded off to facilitate this motion. Having been started in this way, the rest of the links 39 will be guided backwardly around on the deflector 49 as the rack is lowered by the action of the pawls and the load upon it.

When the rack has been lowered enough so that the top housing member 31 is practically almost entirely within the second member 28 the work rest 50 will come in contact with the top of the member 28 and the further downward motion of the rack will bring these two members 28 and 31 down with it positively, the flexible links passing all the time into the receiver 45. This operation continues until all the links 36 and 39 have swung out backwardly through the openings 25, 30 and 32 against the deflector 49 and then swung backwardly from the rigid part 35 of the rack.

When the parts are in this position, the jack is collapsed to its lowest position which in the present case is about a third the length of the rack, although it can be multiplied within reasonable limits. The two flexible sections of the rack extend clear to the end of the receiver 45. The receiver is now swung up on the pivot 43 to the dotted line position in Fig. 1. The cover plate 46, which is used to keep out dirt and dust as well as moisture, is received in the guide 48 which is a part of the receiver and the parts occupy no more space vertically than an ordinary old fashioned rigid ratchet jack and no more floor space than that jack plus the area of the receiver 45.

The casing can be made of a casting or pressed metal and the latter can be used economically for the telescoping housing members 22, 28 and 31 and the casing 45. The member 31 can be eliminated by making the top rigid section 35 of the rack serve its purpose. The whole construction is almost as simple as the ordinary rigid rack jacks and the cost of manufacture is very little greater. Yet, with less minimum height, it can be made to raise a load two or three times higher.

Although I have illustrated and described only one form of the invention I am aware of the fact that modifications can be made therein by any person skilled in the art without departing from the scope of the invention as expressed in the claims. Therefore, I do not wish to be limited to all the details of construction herein shown and described, but what I do claim is:

1. In a lifting jack, the combination of a series of telescoping hollow members, and a flexible rack housed in the telescoping hollow members with means for raising the top of the rack above said hollow members.

2. In a lifting jack, the combination of a casing having a guide, a series of telescoping hollow members movable therein, and a flexible rack housed in the telescoping hollow members made up of pivoted links, one of which projects beyond the others above it to engage the bottom of one of said hollow members to cause it to rise with the rack.

3. In a lifting jack, the combination of a casing having a guide, a series of telescoping hollow members movable therein, and a flexible rack housed in the telescoping hollow members, one of the links of which projects laterally beyond the others above it to engage the bottom of one of said hollow members to cause it to rise with the rack.

4. In a lifting jack, the combination of a series of telescoping hollow members constituting a guide, and a flexible rack therein, each of said hollow members having a side opening near the bottom registering with each other when the members are lowered to allow the parts of the rack to be discharged laterally through the openings at a point above the bottoms of the hollow members as the rack is lowered.

5. In a lifting jack, the combination with a casing having a vertical guide, a hollow member fitting in and slidable up and down in said guide, a rack comprising a rigid section at the top and pivoted links connected with the bottom of the rigid section and movable up and down in the guide and hollow member in which they fit, whereby the guide and hollow member keep the flexible part of the rack from lateral motion, and means co-operating with the rack for raising and lowering it.

6. In a lifting jack, the combination with a casing having a vertical guide, a hollow member fitting in and slidable up and down in said guide, a rack comprising pivotally connected links movable up and down in the guide and hollow member and fitting against the internal surfaces thereof, and means co-operating with the rack for raising and lowering it.

7. In a lifting jack, the combination with a casing having a vertical guide, a hollow member of the same shape as said guide movable up and down therein, a second hollow member fitting and movable up and down in the first hollow member constituting a telescoping support, a flexible rack fitting in the inner hollow member and made up of a plurality of individually connected links held from lateral motion by said inner hollow member, and means co-operating with the rack for raising and lowering it in the casing.

8. In a lifting jack, the combination with a casing having a vertical guide, a hollow member of the same shape as said guide movable up and down therein, a second hollow member fitting and movable up and down in the first hollow member constituting a telescoping support, a rack fitting in said hollow members and having an upper rigid section and made up at the bottom of a plurality of individually connected sections, means for preventing each hollow member from being lifted out of the one below, and means co-operating with the rack for raising the rigid section in the casing to a point above the top of the second hollow member.

9. In a lifting jack, the combination with a casing having a vertical guide, a hollow member of the same shape as said guide movable up and down therein, a second hollow member fitting and movable up and down in the first hollow member constituting a telescoping support, a rack fitting in said hollow members and having an upper rigid section adapted to rise above the upper hollow member a distance substantially equal to the height thereof, and made up at the bottom of a plurality of individually connected links, and means co-operating with the rack for raising it to a point at which the entire rack stands up more than twice the height of the casing.

10. In a lifting jack, the combination of a casing having a vertical guide, a flexible rack movable up and down in said guide, and a receiver of substantially the same size and shape as said guide pivotally connected with the bottom of said casing in position to receive said rack when the rack is lowered.

11. In a lifting jack, the combination of a casing having a vertical guide, a flexible rack therein, means cooperating with the rack for raising and lowering it in the guide, a deflector at the bottom of the rack for moving the lower flexible sections of the rack rearwardly in the casing, and a receiver pivoted to the bottom of the casing and capable of lying in a horizontal position to receive the flexible rack when it is lowered, said receiver being movable to a vertical position against the casing with the flexible rack therein.

12. In a lifting jack, the combination of a casing having a vertical guide, a flexible rack therein, means cooperating with the rack for raising and lowering it in the guide, and a receiver capable of lying in a horizontal position to receive the flexible rack when it is lowered, said receiver being movable to an upright position with the flexible rack therein.

13. In a lifting jack, the combination of a casing having a vertical guide, a flexible rack therein, means co-operating with the rack for raising and lowering it in the guide, a receiver pivoted to the bottom of the casing and capable of lying in a horizontal position to receive the flexible rack, said receiver being capable of being moved to a vertical position adjacent to the casing with the flexible rack therein, and a cover for the space between the receiver and the casing foldable into the receiver when it is folded up into vertical position.

14. In a lifting jack, the combination of a casing having a vertical guide, a flexible rack therein, means cooperating with the rack for raising and lowering it in the guide, and a receiver pivoted to the bottom of the casing and capable of lying in a horizontal position to receive the flexible rack, said receiver being capable of being swung to a vertical position adjacent to the casing with the flexible rack therein.

15. In a lifting jack, the combination with a plurality of hollow members in telescoping relation and fitting each other to prevent relative lateral motion, of a rack comprising a series of links pivotally connected in alignment inside said hollow members, said links having a continuous series of teeth along one side, pawl mechanism located at one side of the telescoping members for raising and lowering the rack, and means whereby the extension of the rack will carry some of said telescoping members with it part way.

16. In a lifting jack, the combination with a plurality of hollow members in telescoping relation and fitting each other to prevent relative lateral motion, of a rack comprising a series of links pivotally connected in alignment inside said hollow members, said links having a continuous series of teeth along one side, and means located at one side of the telescoping hollow members and projecting within them for operating the rack.

17. In a lifting jack, the combination with a plurality of hollow members in telescoping relation and fitting each other to prevent relative lateral motion, of a rack comprising a series of links pivotally connected in alignment inside said hollow members, said links having a continuous series of teeth along one side, pawl mechanism located at one side of the telescoping members for raising and lowering the rack, and means for operating the rack by means of said teeth, the links all being pivoted together along one edge, whereby they can swing away from each other in one direction only.

18. In a lifting jack, the combination with a plurality of hollow members in telescoping relation and fitting each other to prevent relative lateral motion, of a rack comprising a series of links pivotally connected in alignment inside said hollow members, said links having a continuous series of teeth along one side, pawl mechanism located at one side of the telescoping members for raising and lowering the rack, and means for operating the rack.

19. A lifting jack comprising a main body, a strut vertically movable in said main body and comprising two members articulated together upon a lateral articulation, a vertically movable stiffener member slidably associated with the strut and telescopically supported in the main body, said strut and stiffener member having inter-engaging parts such that vertical movement of the strut will produce vertical movement of the stiffener member, and means by which said strut may be elevated relative to the main body.

20. A lifting jack comprising a main body, a strut movably mounted in said main body and comprising two members articulated together upon a lateral articulation, a stiffener element slidably mounted in the main body and telescoped upon the strut adjacent its articulation, a lost motion connection between the structure and stiffener element by which the stiffener element may be projected when the articulation moves beyond the main body and means by which the strut may be projected from the main body.

In testimony whereof I have hereunto affixed my signature.

ALVIN L. JOHNSON.